(12) United States Patent
Yoon et al.

(10) Patent No.: US 8,555,301 B2
(45) Date of Patent: Oct. 8, 2013

(54) INTEGRATED DISK DRIVING MODULE INCLUDING A LATERAL SURFACE PLATE BENT FROM AN UPPER PLATE

(75) Inventors: Hoeop Yoon, Seoul (KR); Sejong Kim, Seoul (KR); Jeongho Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 243 days.

(21) Appl. No.: 13/038,651

(22) Filed: Mar. 2, 2011

(65) Prior Publication Data

US 2011/0219391 A1    Sep. 8, 2011

(30) Foreign Application Priority Data

Mar. 4, 2010  (KR) .................. 10-2010-0019615
Mar. 4, 2010  (KR) .................. 10-2010-0019616

(51) Int. Cl.
*G11B 7/00*        (2006.01)
(52) U.S. Cl.
USPC ........................... 720/697; 720/663; 720/675
(58) Field of Classification Search
USPC ................ 720/659–661, 663, 671, 673–680, 720/695–698
See application file for complete search history.

(56) References Cited

U.S. PATENT DOCUMENTS

| | | | |
|---|---|---|---|
| 6,512,734 B1 * | 1/2003 | Chang et al. .................. | 720/675 |
| 6,819,021 B1 * | 11/2004 | Horng et al. .................... | 310/91 |
| 7,124,419 B2 * | 10/2006 | Fujibayashi .................. | 720/663 |
| 2001/0006442 A1 * | 7/2001 | Komatsu et al. ........... | 360/99.04 |
| 2007/0044115 A1 * | 2/2007 | Murakami .................... | 720/697 |
| 2008/0244631 A1 * | 10/2008 | Lin et al. ....................... | 720/659 |

FOREIGN PATENT DOCUMENTS

JP           11299168 A  * 10/1999

OTHER PUBLICATIONS

English translation of JP 11299168 A.*

* cited by examiner

*Primary Examiner* — Nathan Danielsen
(74) *Attorney, Agent, or Firm* — Saliwanchik, Lloyd & Eisenschenk

(57) ABSTRACT

An integrated disk driving module is disclosed, the module including a base unit including a spindle motor fixture including an opening-formed upper plate, a lateral surface plate bent from the upper plate to form an accommodation space, and a spindle motor fixture concavely formed from the upper plate toward the accommodation space, wherein the spindle motor fixture is integrally formed with the upper plate; and a spindle motor fixed inside the spindle motor fixture to rotate a disk.

16 Claims, 10 Drawing Sheets

INTEGRATED DISK DRIVING MODULE INCLUDING A LATERAL SURFACE PLATE BENT FROM AN UPPER PLATE

CROSS-REFERENCE TO RELATED APPLICATIONS

This application claims the benefit under 35 U.S.C. §119 of Korean Application Nos. 10-2010-0019615, filed Mar. 4, 2010 and 10-2010-0019616, filed Mar. 4, 2010, which are hereby incorporated by reference in their entirety.

BACKGROUND OF THE DISCLOSURE

1. Field of the Invention

The present disclosure relates to an integrated disk driving module.

2. Description of Related Art

In general, an ODD (Optical Disk Driver) stores huge data on a disk, and reads the data stored in the disk.

The ODD largely includes a base body, a spindle motor coupled to the base body via a coupling screw, a stepping motor coupled to the base body via a coupling screw, and an optical pickup module storing data on a disk or reading the data from the disk.

The spindle motor is coupled to the base body via a mounting plate, and rotates an optical disk for storing data or an optical disk stored with data at a high speed.

The stepping motor is coupled to the base body via a mounting plate, and feeds the optical pickup module to a radial direction of the optical disk.

The optical pickup module is coupled to a guide shaft coupled to the base body via a coupling screw and slides along the guide shaft by rotation of a lead screw of the stepping motor. The optical pickup module slides along the guide shaft to store data on the optical disk and reads the data stored in the optical disk.

A stepping motor of an optical disk apparatus according to prior art is coupled to a base body via a mounting plate and a coupling screw, and an optical pickup module is coupled to a guide shaft coupled to a base body via a coupling screw to the disadvantage of increasing the number of parts comprising the optical disk apparatus.

The conventional optical disk apparatus is also disadvantageous in that the number of parts increases to take many hours for assembly.

The conventional optical disk apparatus is further disadvantageous in that product accuracy decreases due to manufacturing tolerances of the base body and the stepping motor.

The conventional optical disk apparatus is still further disadvantageous in that the stepping motor is coupled to the base body via a coupling screw to result in frequent assembly badness in which the stepping motor is not mounted at a designated position.

The conventional optical disk apparatus is still further disadvantageous in that a mounting plate for coupling the stepping motor to the base body is needed to increase size and weight of the optical disk apparatus and to be prone to external shock.

BRIEF SUMMARY

The present disclosure is to provide an integrated disk driving module configured to reduce the number of parts by integrally forming a stepping motor to a base unit, to reduce assembly time as a result of reduced number of parts, to improve product performance as a result of reduced assembly tolerances, to inhibit incomplete assembly by arranging a spindle motor at a designated position and to reduce size and weight.

The present disclosure is to provide an integrated disk driving module configured to reduce the number of parts by integrally forming a guide shaft of an optical pickup module to a base unit, to reduce assembly time as a result of reduced number of parts and to improve product performance as a result of reduced assembly tolerances.

An object of the present disclosure is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present disclosure, there is provided an integrated disk driving module, the module comprising: a base unit including a spindle motor fixture including an opening-formed upper plate, a lateral surface plate bent from the upper plate to form an accommodation space, and a spindle motor fixture concavely formed from the upper plate toward the accommodation space, wherein the spindle motor fixture is integrally formed with the upper plate; and a spindle motor fixed inside the spindle motor fixture to rotate a disk.

Preferably, the spindle motor fixture integrally formed with the upper plate includes a lateral wall unit bent from the upper plate in a same direction as that of the lateral surface plate, and a floor unit connected to the lateral wall unit.

Preferably, the integrated disk driving module further includes a circuit substrate interposed between the spindle motor and the floor unit to be electrically connected to the spindle motor, wherein the lateral wall unit is formed with at least one opening through which part of the circuit substrate passes.

Preferably, the floor unit is formed with at least one floor unit-penetrating circuit substrate alignment hole for aligning the circuit substrate on a designated position on the floor unit.

Preferably, the integrated disk driving module further includes a circuit substrate interposed between the spindle motor and the floor unit to be electrically connected to the spindle motor, wherein the floor unit is formed with at least one opening through which part of the circuit substrate passes.

Preferably, a center of the floor unit of the upper plate is formed with a through hole, and a bearing housing of the spindle motor is coupled to the through hole of the floor unit by caulking.

Preferably, an inner lateral surface of the floor unit formed by the through hole formed at the center of the floor unit is formed with an internal rotation prevention groove concavely formed from the inner lateral surface to inhibit the bearing housing of the spindle motor from rotating relative to the floor unit.

Preferably, the center of the floor unit is formed with a burring unit protruded from a bottom surface of the floor unit toward an upper surface facing the bottom surface, wherein the spindle motor includes a cup-shaped bearing housing coupled to the burring unit, a bearing coupled to an inner side of the bearing housing, a rotation shaft rotatably coupled to the bearing, a stator coupled to the bearing housing and a rotor coupled to the rotation shaft to interact with the stator.

Preferably, the integrated disk driving module further includes a lead screw fixed to the upper plate by a coupling screw.

Preferably, the integrated disk driving module further includes an optical pickup module that is fed by the stepping motor.

Preferably, the integrated disk driving module further includes first and second guide shafts coupled to the upper plate of the base unit to guide the optical pickup module.

Preferably, the base unit includes a pair of guide shaft fixtures bent from the upper plate to a direction of the accommodation space for respectively fix a first distal end of the first guide shaft and a second distal end facing the first distal end, and a pair of second guide shafts bent from the upper plate to a direction of the accommodation space for respectively securing a third distal end of the second guide shaft and a fourth distal end facing the third distal end.

Preferably, one of first guide shaft fixtures fixed to the first distal end is formed with a through hole through which the first distal end passes, and the remaining one first guide shaft fixture fixed to the second distal end is formed with an insert groove through which the second distal end is inserted.

Preferably, one of second guide shaft fixtures fixed to the third distal end is formed with a through hole through which the third distal end passes, and the remaining one second guide shaft fixture fixed to the fourth distal end is formed with an insert groove through which the fourth distal end is inserted.

Preferably, the integrated disk driving module further includes a first pressure member fixed at the upper plate for applying pressure to the first distal end, a second pressure member fixed at the upper plate for applying pressure to the second distal end, a third pressure member fixed at the upper plate for applying pressure to the third distal end, and a fourth pressure member fixed at the upper plate for applying pressure to the fourth distal end.

Preferably, each of the first through fourth pressure members includes a leaf spring.

Preferably, the integrated disk driving module further includes a height adjustment screw coupled to the upper plate of the base unit to adjust heights of the first and second distal ends of the first guide shaft, and coupled to the upper plate of the base unit to adjust heights of the third and fourth distal ends of the second guide shaft.

In another general aspect of the present disclosure, there is provided an integrated disk driving module, the module comprising: a base unit including a spindle motor fixture including an opening-formed upper plate, a lateral surface plate bent from the upper plate to form an accommodation space, and a spindle motor fixture concavely formed from the upper plate toward the accommodation space, wherein the guide shaft fixture includes a base unit integrally formed with the upper plate, an optical pickup module coupled to the guide shaft fixture, and first and second guide shafts secured to the guide shaft fixture for guiding the optical pickup module.

Preferably, the integrated disk driving module further includes a stepping motor mounted on the upper plate and formed with a lead screw coupled to the optical pickup module.

Preferably, the integrated disk driving module further includes a spindle motor mounted on the upper plate for rotating a disk.

Preferably, the guide shaft fixture includes first guide shaft fixtures bent from the upper plate to a direction of the accommodation space for respectively securing a first distal end of the first guide shaft and a second distal end facing the first distal end, and a pair of second guide shafts bent from the upper plate to a direction of the accommodation space for respectively securing a third distal end of the second guide shaft and a fourth distal end facing the third distal end.

Preferably, any one of the first guide shaft fixtures is formed with a through hole, and a remaining one of the first guide shaft fixtures is formed with an insertion groove.

Preferably, any one of the second guide shafts is formed with a through hole, and a remaining one of the second guide shaft fixtures is formed with an insertion groove.

Preferably, the integrated disk driving module further includes a first pressure member fixed at the upper plate for being contacted with the first distal end, a second pressure member fixed at the upper plate for being contacted with the second distal end, a third pressure member fixed at the upper plate for being contacted with the third distal end, and a fourth pressure member fixed at the upper plate for being contacted with the fourth distal end.

Preferably, each of the first through fourth pressure members includes a leaf spring.

Preferably, the integrated disk driving module further includes a height adjustment screw coupled to the upper plate of the base unit to adjust heights of the first and second distal ends of the first guide shaft, and coupled to the upper plate of the base unit to adjust heights of the third and fourth distal ends of the second guide shaft.

Technical problems to be solved by the present disclosure are not restricted to the above-mentioned, and any other technical problems not mentioned so far will be clearly appreciated from the following description by those skilled in the art.

DETAILED DESCRIPTION

Figure 1:
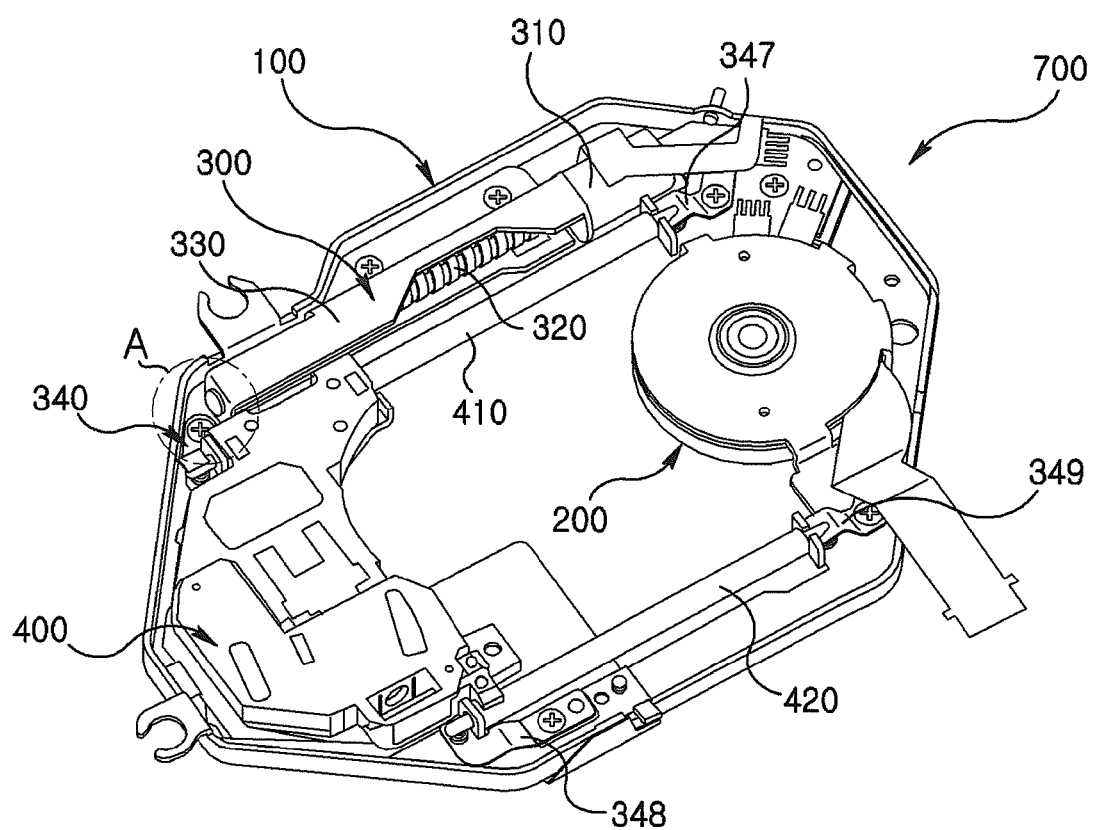
FIG. 1 is a rear perspective view of an integrated disk driving module according to a first exemplary embodiment of the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-10 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

First Exemplary Embodiment

Figure 2:
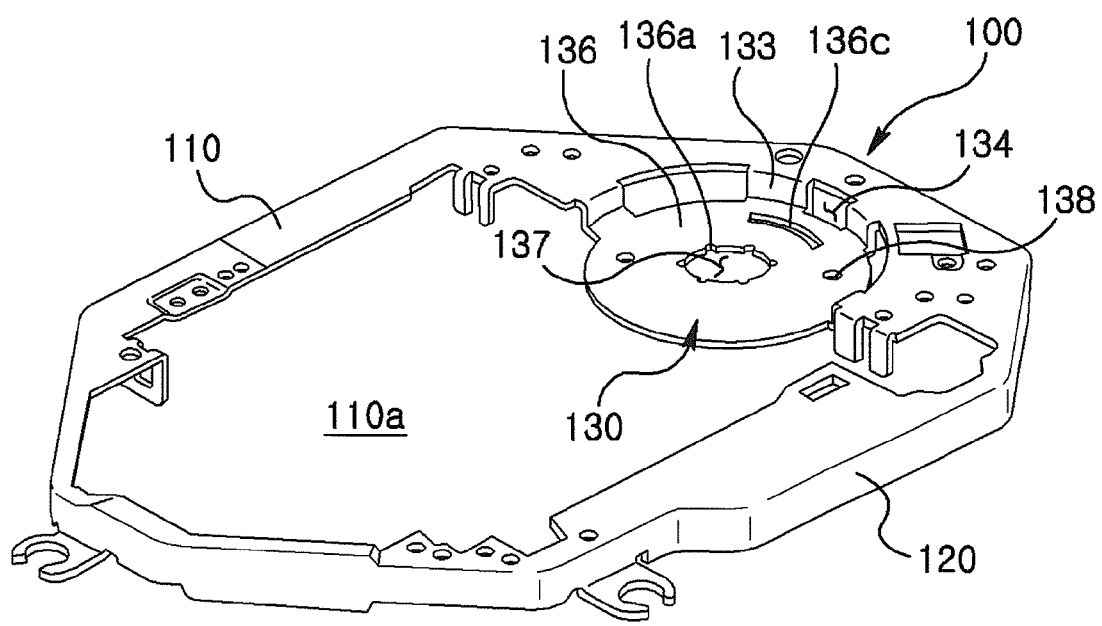
FIG. 2 is a front perspective view of a base unit of FIG. 1.
Figure 3:
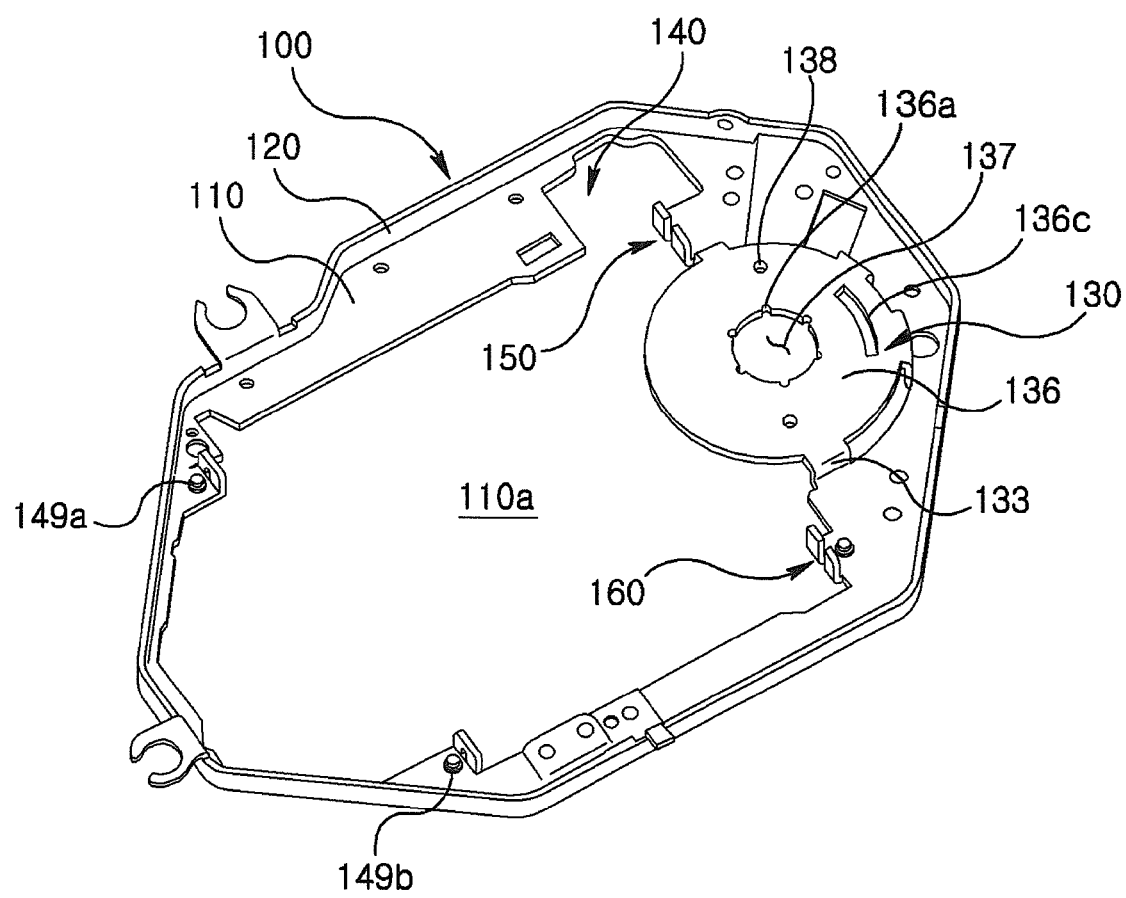
FIG. 3 is a rear perspective view of a base unit of FIG. 1.

FIG. 1 is a rear perspective view of an integrated disk driving module according to a first exemplary embodiment of the present invention, FIG. 2 is a front perspective view of a base unit of FIG. 1, and FIG. 3 is a rear perspective view of a base unit of FIG. 1.

Referring to FIG. 1, an integrated disk driving module (700) may include a base unit (100), a spindle motor (200) and a stepping motor (300). The integrated disk driving module (700) may further include an optical pickup module (400).

Referring to FIGS. 2 and 3, the base unit (100) includes an upper plate (110), a lateral surface plate (120) and a stepping motor fixture (140). The base unit (100) may further include first and second guide shaft fixtures (150, 160).

The upper plate (110) includes a metal plate, and is centrally formed with an opening (110a).

The opening (110a)-formed upper plate (110) may take the shape of an octagonal plate when viewed from a plane. Although the present exemplary embodiment of the present disclosure describes the upper plate (110) of an octagonal plate, the shape of the upper plate (110) may take various shapes based on arrangement and shape of the spindle motor (200, described later), the stepping motor (300) and the optical pickup module (400).

A lateral surface plate (120) is bent from an edge of the upper plate (110) to one direction of the upper plate (110), and an accommodation space is formed at the base unit (100) by the upper plate (110) and the lateral surface plate (120). In the present exemplary embodiment, the lateral surface plate (120) is formed perpendicularly to the upper plate (110), for example.

The spindle motor fixture (130) is formed in the shape of a recess from the upper plate (110) toward the accommodation space, and in the present exemplary embodiment, the spindle motor fixture (130) is integrally formed with the upper plate (110).

The recess-shaped spindle motor fixture (130) includes a lateral wall unit (133) and a floor unit (136), where the lateral wall unit (133) and the floor unit (136) are integrally formed with the upper plate (110).

The lateral wall unit (133) is bent from the upper plate (110) to a same direction as the bent direction of the lateral wall unit (120), and may be aligned in parallel with the lateral surface plate (120). That is, the lateral wall unit (133) is aligned perpendicularly formed relative to the upper plate (110), for example.

The lateral wall unit (133) bent from the upper plate (110) is formed with at least one opening (134), where three openings (134) may be formed at the lateral wall unit (133). Each of the three openings (134) may be formed in a same size or in a different size.

A circuit substrate (180, described later) electrically connected to the spindle motor (200, described later) is passed by the opening (134) formed at the lateral wall unit (133). Furthermore, the integrated driving module (700) can have a lighter weight by the openings (134) formed at the lateral wall unit (133).

The floor unit (136) is integrally formed with the lateral wall unit (133), and may be aligned in parallel with the upper plate (110), for example. In the present exemplary embodiment, the floor unit (136) takes the same shape as that of the spindle motor (200, described later). For example, the floor unit (136) may take the shape of a disk when viewed on a plane. Although the present exemplary embodiment describes and illustrates the disk-shaped floor unit (136), the floor unit (136) may alternatively take various other shapes, in addition to the disk shape.

A center of the floor unit (136) is formed with a circle-shaped through hole (137), into which a bearing housing (139) for securing the spindle motor (200, described later) to the floor unit (136) and securing a bearing of the spindle motor (200) and a rotation shaft is coupled.

Referring to FIG. 3, an inner lateral surface of the floor unit (136) formed by the through hole (137) formed at the center of the floor unit (136) is formed with an internal rotation prevention groove (136a) concavely formed from the inner lateral surface to inhibit the bearing housing of the spindle motor (200) from rotating relative to the floor unit (136).

At least one alignment hole (138) is formed about the through hole (137) formed at the center of the floor unit (136). The alignment hole (138) functions to align a circuit substrate (described later) interposed between the floor unit (136) and the spindle motor (200) arranged on the floor unit (136) on a designated position of the floor unit (136). The alignment hole (138) penetrates an upper surface on which the spindle motor (200) is disposed and a bottom surface facing the upper surface on the floor unit (136).

The floor unit (136) is formed with a slit-shaped opening (136c) for extracting part of the circuit substrate (180) interposed between the spindle motor (200) and the spindle motor fixture (130) to outside of the spindle motor fixture (130) through the floor unit (136). The slit-shaped opening (136c) may take the shape of a linear shape or a curved shape when viewed from a plane.

Referring to FIG. 3 again, the upper plate (110) is formed with a first guide shaft fixture (150) and a second shaft fixture (160) to secure first and second guide shafts (described later).

Each of the first and second shaft fixtures (150, 160) is formed at each side of the upper plate (110) of the base unit (100).

The first guide shaft fixture (150) is integrally formed with the upper plate (110) of the base unit (100), and functions to secure a first guide shaft (410, see FIG. 4a) of the optical pickup module (400, described later) to the base unit (100).

The first guide shaft fixture (150) is formed in a pair on the upper plate (110), each facing the other fixture, and each of the pair of first guide shaft fixtures (150) is bent from the upper plate (110) toward the accommodation space.

The one first guide shaft fixture (150) is formed with an insertion groove in which a first distal end of the first guide shaft (described later) is inserted, and the remaining another first guide shaft fixture (150) is formed with a through hole through which a second distal end facing the first distal end of the first guide shaft (410) passes. In the present exemplary embodiment, the through hole through which the second distal end of the first guide shaft (410) passes may take the shape of an oblong (or a slit).

Furthermore, a coupling hole is formed at each position facing the first guide shaft protruded outside of each of the first guide shaft fixtures (150) on the upper plate (110), and each coupling hole is formed with a height adjustment screw (149a). The height adjustment screw (149a) adjusts a height of the first guide shaft (410) relative to the upper plate (110).

The second guide shaft fixture (160) arranged in parallel with the first guide shaft fixture (150) is formed at the upper plate (110) of the base unit (100), and functions to secure a second guide shaft (420, described later and see FIG. 5) to the upper plate (110) of the base unit (100).

The second guide shaft fixture (160) is arranged on the upper plate (110) in a pair, each facing the other, and each of the pair of second guide shaft fixtures (160) is bent from the upper plate (110) toward the accommodation space.

One of the pair of second guide shaft fixtures (160) is formed with an insertion groove through which a third distal end of the second guide shaft (420, described later) is inserted. The remaining one of the pair of second guide shaft fixtures (160) is formed with a through hole through which a fourth distal end facing the third distal end of the second guide shaft (420, described later) passes.

In the present exemplary embodiment, the through hole for passing the fourth distal end of the second guide shaft (420) may take the shape of an oblong or a slit.

Coupling holes are formed at positions facing the second guide shaft (420) protruded outside of the second guide shaft fixtures (160) on the upper plate (110), where each of the coupling holes is formed with a height adjustment screw (149b). The height adjustment screw (149b) adjusts a height between second guide shaft (420) and the upper surface (110).

Figure 4A:
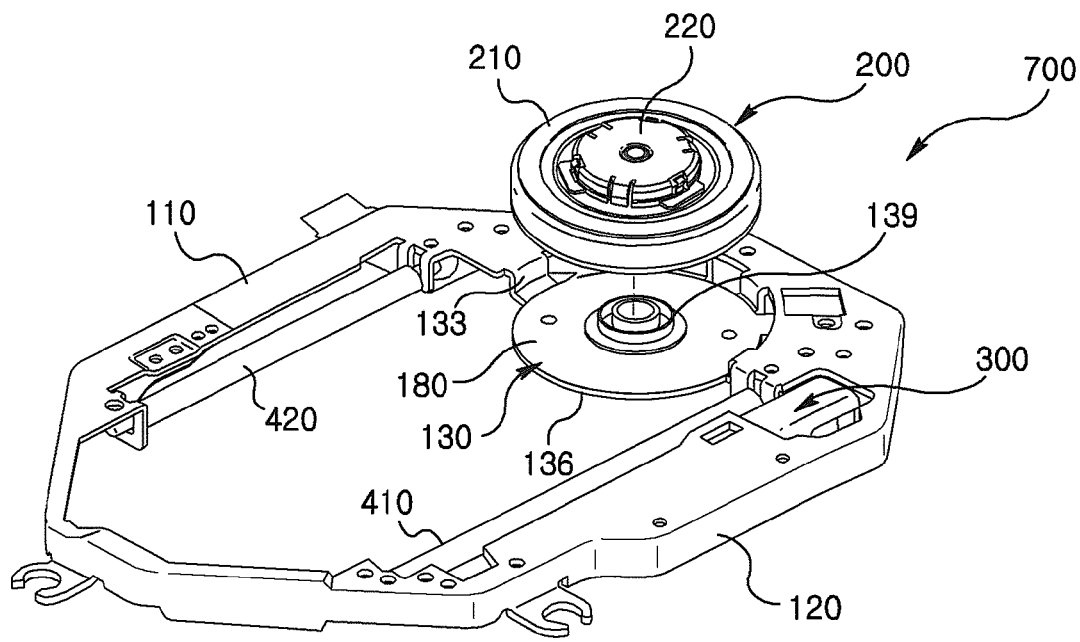
FIG. 4a is an exploded perspective view of a base unit and a spindle motor of FIG. 2.

FIG. 4a is an exploded perspective view of a base unit and a spindle motor of FIG. 2.

Referring to FIGS. 1 and 4a, the spindle motor (200) is arranged inside a spindle motor fixture (130) concavely formed from the upper plate (110) of the base unit (100).

The spindle motor (200) includes a bearing housing (139), a stator (not shown) secured at the bearing housing (139) and a rotor (210) rotating in association with the stator coupled to a rotation shaft (not shown) coupled to the bearing housing (139). The spindle motor (200) may further include a disk fixture device (220) coupled to the rotation shaft for securing a disk.

The bearing housing (139) is coupled to a through hole (137) formed at the floor unit (136) of the spindle motor fixture (130) bent from the upper plate (110) of the base unit (100). In the present exemplary embodiment, the floor unit (136) of the spindle motor fixture (130) functions as a mounting plate coupled to the spindle motor of prior art via a coupling screw. In the present exemplary embodiment, configuration of the spindle motor (200) is not limited thereto, but may include other various constituent elements or may delete some of the above-mentioned configurations.

The disk fixture device (220) is rotated along with a rotation shaft by being coupled to the rotation shaft of the spindle motor (200), and is coupled with an optical disk for storing data or an optical disk for reading the stored data.

The spindle motor (200) is arranged with a thin circuit substrate (180) that is applied with a driving signal. In the present exemplary embodiment, the circuit substrate (180) may be a flexible circuit substrate.

Part of the circuit substrate (180) is interposed between the spindle motor (200) and the floor unit (136) of the spindle motor fixture (130), and is extracted outside of the spindle motor fixture (130) through an opening (134) formed at the lateral surface unit (133) of the spindle motor fixture (130).

Figure 4B:
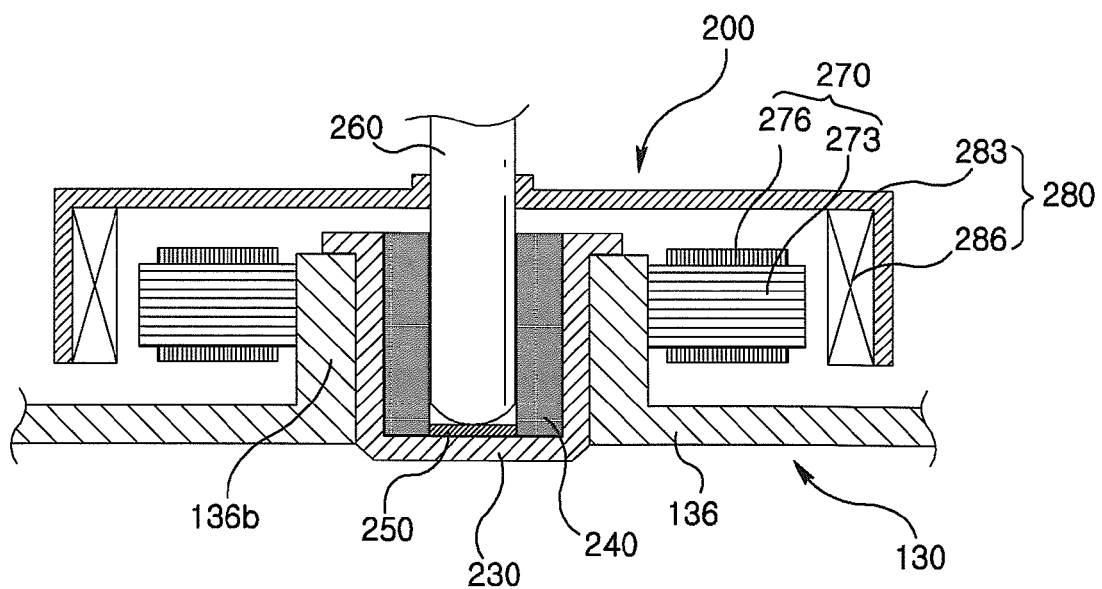
FIG. 4b is a perspective view illustrating a spindle motor of an integrated driving module and a floor unit of a spindle motor fixture of a base unit according to another exemplary embodiment of the present disclosure.

FIG. 4b is a perspective view illustrating a spindle motor of an integrated driving module and a floor unit of a spindle motor fixture of a base unit according to another exemplary embodiment of the present disclosure.

Referring to FIG. 4b, the floor unit of a spindle motor fixture of a base unit according to another exemplary embodiment of the present disclosure is formed with a cylindrical burring unit (136b) protruded toward an upper surface facing a bottom surface from the bottom surface of the floor unit (136).

The burring unit (136b) is formed therein with an upper surface-opened cup-shaped bearing housing (230), and the bearing housing (230) is coupled therein by a cylindrical bearing (240). The bearing (240) coupled to the bearing housing (230) is rotatably coupled by a rotation shaft (260) relative to the bearing (240). Reference numeral 250 is a thrust bearing that supports the rotation shaft.

The burring unit (136) is formed at a periphery thereof with a stator (270). The stator (270) includes a core (273) formed by stacking a plurality of iron pieces, and a coil (276) wound on the core (273).

The rotation shaft (260) is formed at a periphery thereof with a rotor (280). The rotor (280) includes a yoke (283) and a magnet (286), where the yoke (283) is coupled to the rotation shaft (260), and a part of the yoke (283) facing the core (273) of the stator (270) is formed with the magnet (286). The rotor (280) and the rotation shaft (260) are rotated by a magnetic field generated by the coil (276) wound on the core (273) which is a part of the stator (270) and action of the magnet (286) which is a part of the rotor (280).

Figure 5:
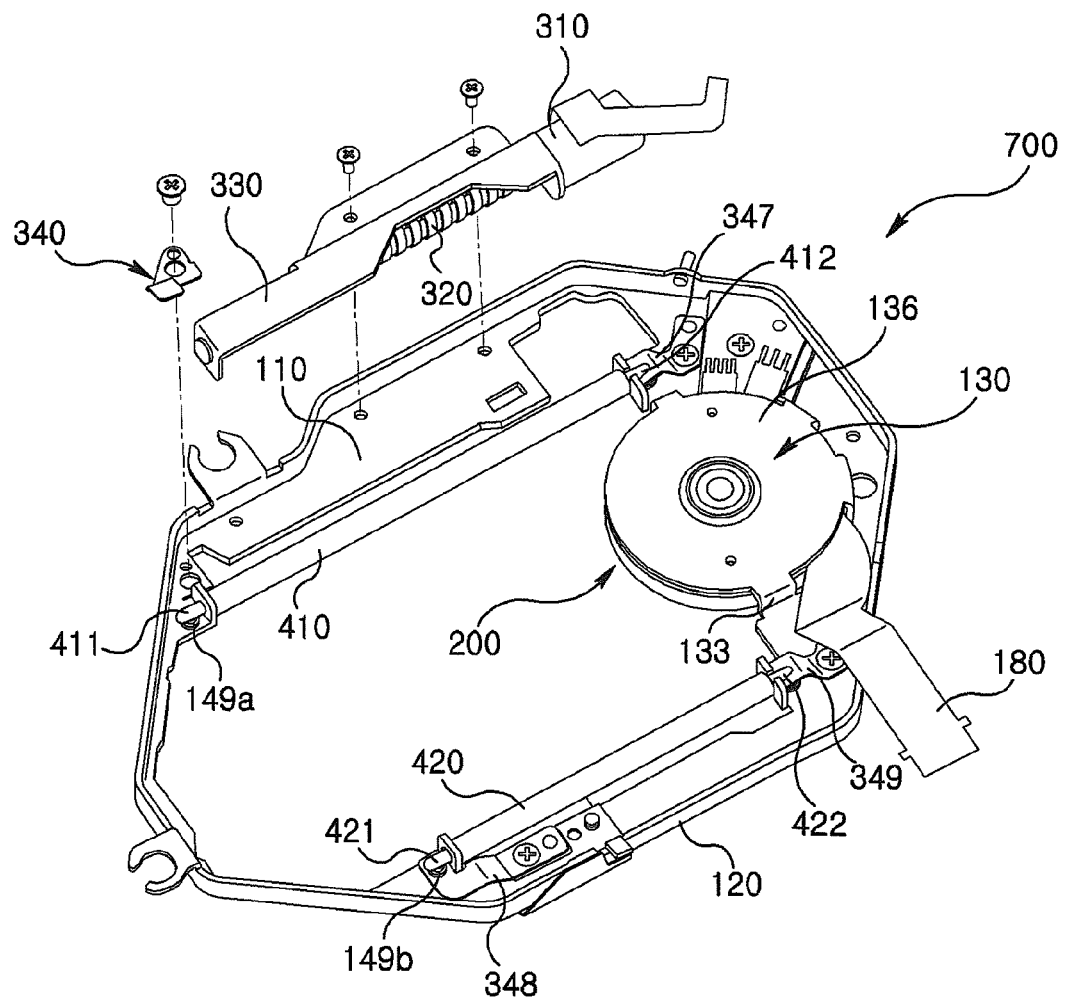
FIG. 5 is an exploded perspective view illustrating a spindle motor coupled to the base unit of FIG. 3.

FIG. 5 is an exploded perspective view illustrating a spindle motor coupled to the base unit of FIG. 3.

Referring to FIGS. 3 and 5, the upper plate (110) of the base unit (100) is coupled with the stepping motor (300), where the stepping motor (300) includes a stepping motor body (310), a lead screw (320), a pivot member (325) and a cover case (330).

The stepping motor body (310) includes a stator (not shown), and the lead screw (320) is rotated in association with the stator. In the present exemplary embodiment, the stepping motor body (310) and the lead screw (320) may include various configurations, such that the configuration of the stepping motor body is not limited thereto.

The lead screw (320) is toward a radial direction of an optical disk secured at the disk fixture device (220) of the spindle motor (200). The lead screw (320) is coupled at a distal end thereof with the cover case (330), where the cover case (330) is secured at the upper plate (110) of the base unit (100) via a coupling screw.

Referring to FIGS. 1 and 5 again, the integrated disk driving module (700) according to an exemplary embodiment of the present disclosure may include an optical pickup module (400).

The optical pickup module (400) reciprocates along a radial direction of the disk by the lead screw (320) of the stepping motor (300) secured to the upper plate (110) of the base unit (100) by a coupling screw, and first and second guide shafts (410, 420) arranged in parallel with the lead screw (320).

The first guide shaft (410) is slidably coupled to one side of the optical pickup module (400), and includes a first distal end (411) and a second distal end (412) opposite to the first distal end (411). The first and second distal ends (411, 412) of the first guide shaft (410) are respectively coupled to the pair of first guide shaft fixtures (150).

The second guide shaft (420) is slidably coupled to the other side opposite to the one side of the optical pickup module (400), and includes a third distal end (421) and a fourth distal end (421) opposite to the third distal end (421). The third and fourth distal ends (421, 422) of the second guide shaft (420) are respectively coupled to the pair of second guide shaft fixtures (160).

Figure 6:
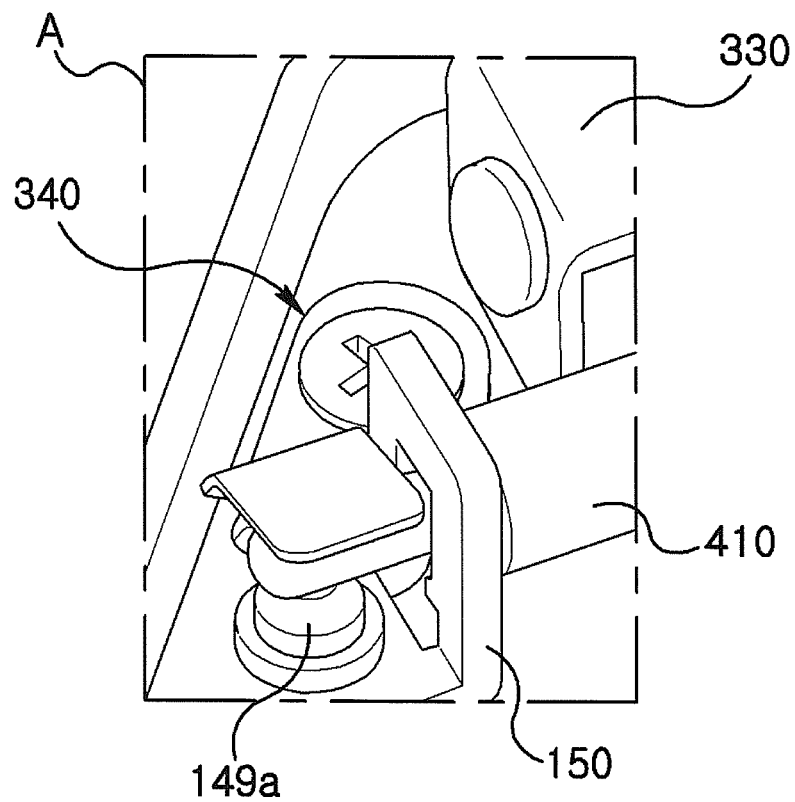
FIG. 6 is a partially enlarged view of 'A' of FIG. 1.

FIG. 6 is a partially enlarged view of 'A' of FIG. 1.

Referring to FIGS. 1 and 6, the first distal end (411) of the first guide shaft (410) is arranged with a first press member (340) includes a first pressure member (340) to inhibit the first and second distal ends (411, 412) of the first guide shaft (410), and a second pressure member (347) is arranged at the second distal end (412).

The third distal end (421) of the second guide shaft (420) is arranged with a third pressure member (348) to inhibit the third and fourth distal ends (421, 422) of the first guide shaft (420), and a fourth pressure member (349) is arranged at the fourth distal end (422).

Each of the first to fourth pressure members (340, 347, 348, 349) takes the shape of a leaf spring, each distal end of one each side of the first to fourth pressure members (340, 347, 348, 349) is secured at the upper plate (110), and each distal end facing the other each side of the first to fourth pressure members (340, 347, 348, 349) applies pressure to the first to fourth distal ends (411, 412, 421, 422).

The integrated disk driving module according to the first exemplary embodiment of the present disclosure has an advantageous effect in that a base unit is formed with a recess-shaped spindle motor fixture for mounting a spindle motor, and the spindle motor fixture is mounted with a spindle motor to reduce the number of parts of the integrated disk driving module, to reduce assembly time as a result of reduced number of parts, to improve product performance as a result of reduced assembly tolerances, to inhibit incomplete assembly and to reduce size and weight.

Second Exemplary Embodiment

Figure 7:
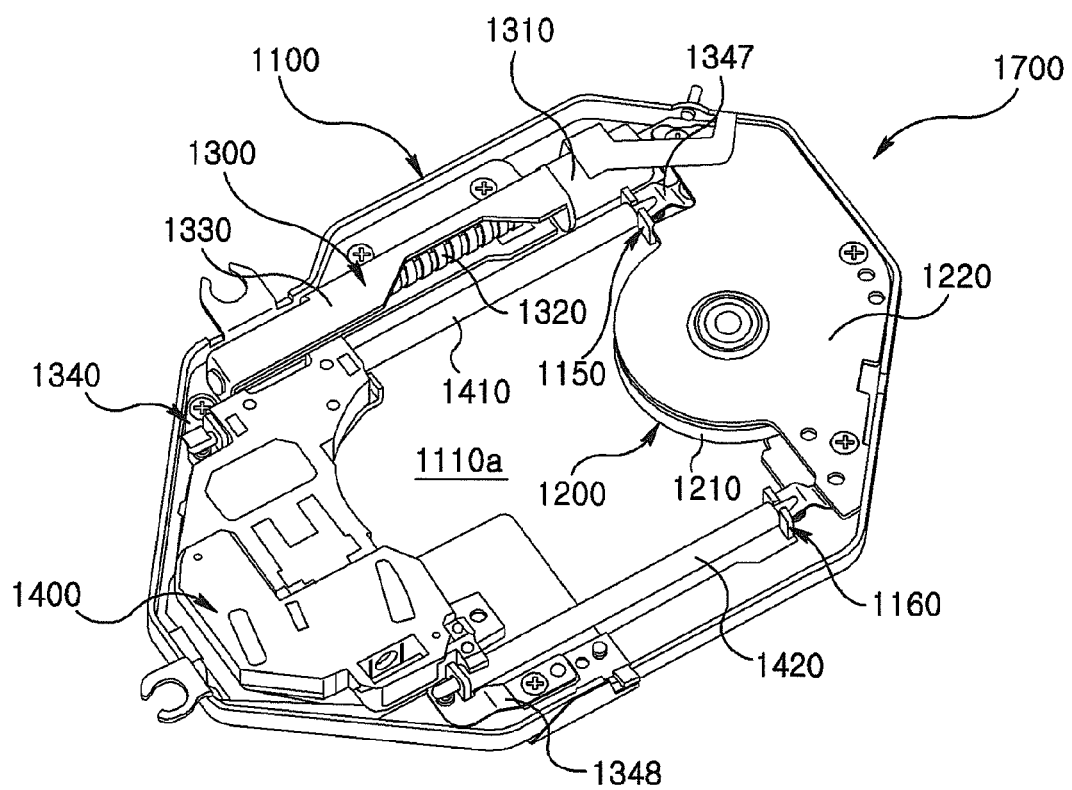
FIG. 7 is a rear perspective view of an integrated driving module according to a second exemplary embodiment of the present disclosure.
Figure 8:
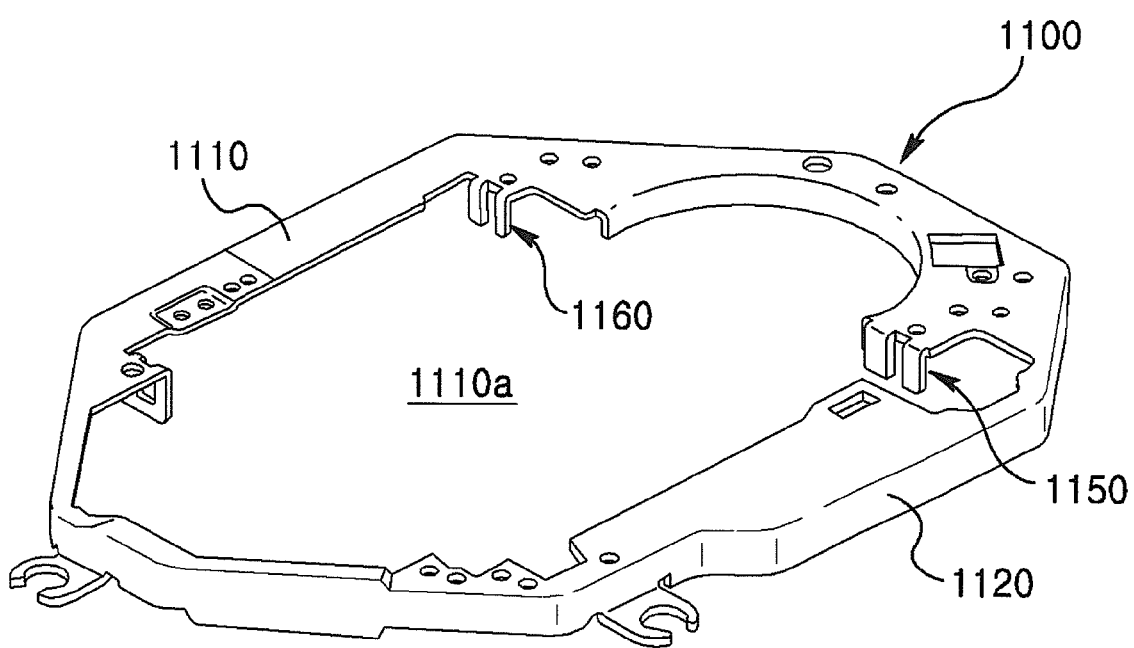
FIG. 8 is a front perspective view of a base unit of FIG. 1.
Figure 9:
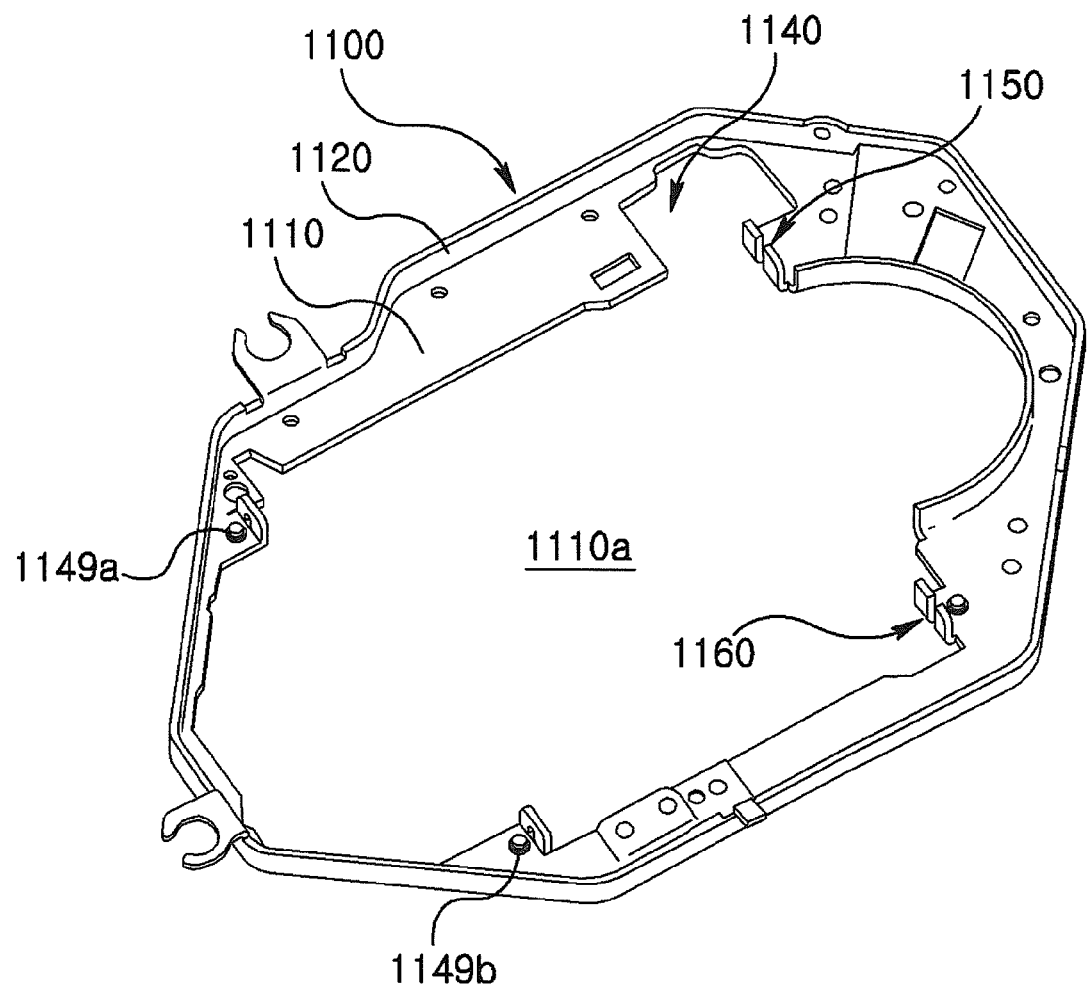
FIG. 9 is a rear perspective view of a base unit of FIG. 1.
Figure 10:
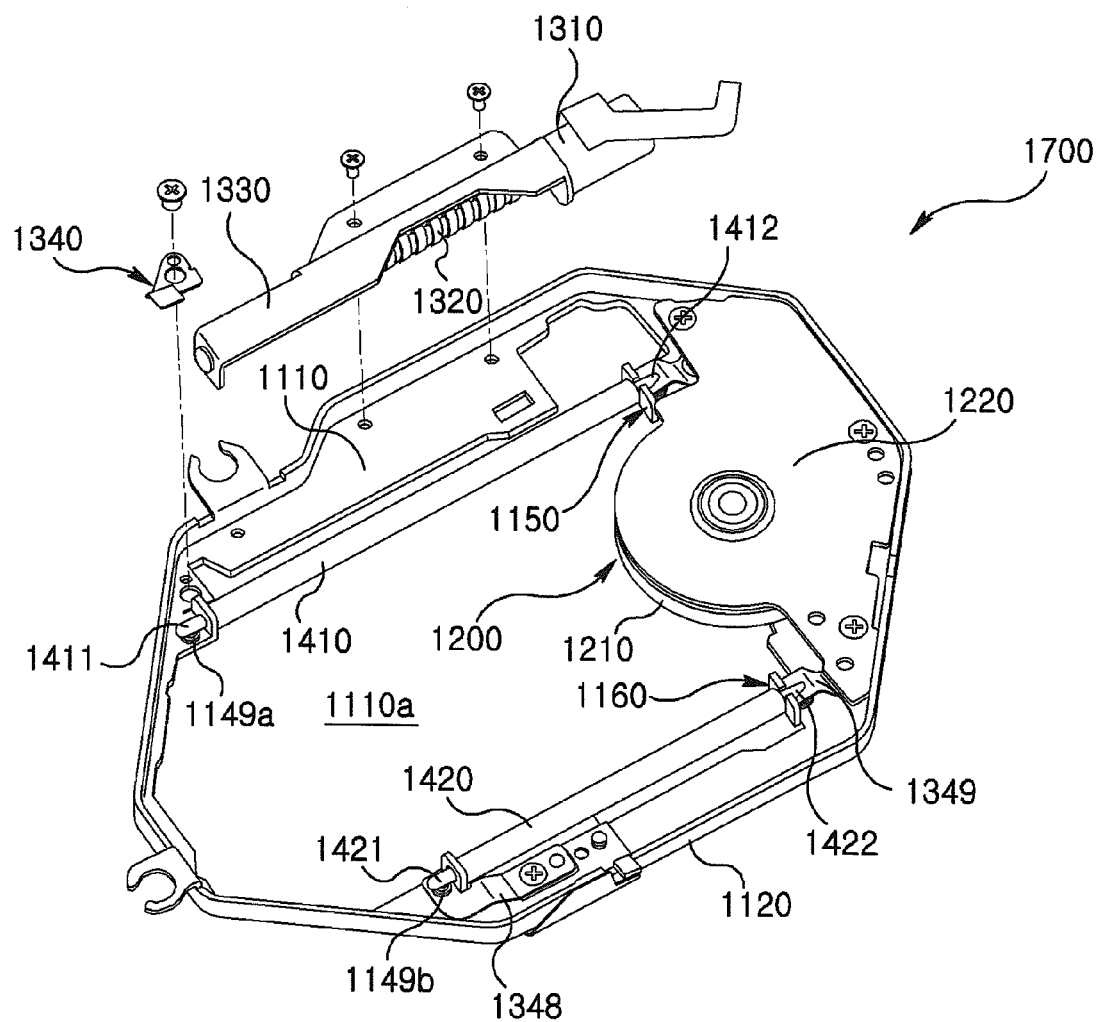
FIG. 10 is a perspective view illustrating first and second guide shafts mounted on the base unit of FIG. 8 for guiding an optical pickup module.

FIG. 7 is a rear perspective view of an integrated driving module according to a second exemplary embodiment of the present disclosure, FIG. 8 is a front perspective view of a base unit of FIG. 1, FIG. 9 is a rear perspective view of a base unit of FIG. 1, and FIG. 10 is a perspective view illustrating first and second guide shafts mounted on the base unit of FIG. 8 for guiding an optical pickup module.

Referring to FIG. 1 again, an integrated disk driving module (1700) includes a base unit (1100), and an optical pickup module (1400). The integrated disk driving module (1700) may further include a stepping motor (1200) and a stepping motor (1300).

Referring to FIGS. 8 and 9, the base unit (1100) includes an upper plate (1100), a lateral surface plate (1120) and guide shaft fixtures (1150, 1160).

The upper plate (1100) includes a metal plate and is centrally formed with an opening (1110a), part of the opening (1110a) takes the shape of a semi-circle, when viewed from a plane, in order to accommodate the spindle motor (1200, described later).

The opening (1110a)-formed upper plate (1100) may take the shape of an octagonal plate when viewed from a plane. Although the present exemplary embodiment of the present disclosure describes the upper plate (1100) of an octagonal plate, the shape of the upper plate (1100) may take various shapes based on arrangement and shape of the spindle motor (1200, described later), the stepping motor (1300) and the optical pickup module (1400).

A lateral surface plate (1120) is bent from an edge of the upper plate (1100) to one direction of the upper plate (1110), and an accommodation space is formed at the base unit (1100) by the upper plate (1110) and the lateral surface plate (1120). In the present exemplary embodiment, the lateral plate (1120) is formed perpendicularly to the upper plate (1110), for example.

The guide shaft fixtures (1150, 1160) function to secure first and second guide shafts (1410, 1420) to the base unit (1100) for feeding the optical pickup module (1400, described later). In the present exemplary embodiment, the guide shaft fixtures (1150, 1160) are integrally formed with the upper plate (1100).

Referring to FIG. 9, the guide shaft fixtures (1150, 1160) are respectively defined as first and second guide shaft fixtures (1150, 1160) for securing the first and second guide shafts (1410, 1420, described later).

The guide shaft fixtures (1150, 1160) are respectively formed at either side of the spindle motor (1200, described later) fixed to the upper plate (1110) of the base unit (1100). The first guide shaft fixture (1150) is integrally formed with the upper plate (1110) of the base unit (1100), and coupled to the first guide shaft (1410, see FIG. 10).

The first guide shaft fixture (1150) is formed in a pair on the upper plate (1110), each facing the other fixture, and each of the pair of first guide shaft fixtures (1150) is bent from the upper plate (1110) toward the accommodation space.

The one first guide shaft fixture (1150) is formed with an insertion groove into which a first distal end of the first guide shaft (1410, described later) is inserted, and the remaining another first guide shaft fixture (1150) is formed with a through hole through which a second distal end facing the first distal end of the first guide shaft (1410) passes. In the present exemplary embodiment, the through hole through which the second distal end of the first guide shaft (1410) passes may take the shape of an oblong (or a slit).

Furthermore, a coupling hole is formed at each position facing first and second distal ends (1411, 1412) of the first guide shaft (1410) protruded outside of each first guide shaft fixtures (1150) on the upper plate (1110), and the each coupling hole is formed with a height adjustment screw (1149a). The height adjustment screw (1149a) adjusts a height of the first guide shaft (1410) relative to the upper plate (1110).

The second guide shaft fixture (1160) arranged in parallel with the first guide shaft fixture (1150) is formed at the upper plate (1110) of the base unit (1100), and functions to secure a second guide shaft (1420, described later and see FIG. 10) to the upper plate (1110) of the base unit (1100).

The second guide shaft fixture (1160) is arranged on the upper plate (1110) in a pair, each facing the other, and each of the pair of second guide shaft fixtures (1160) is bent from the upper plate (1110) toward the accommodation space.

One of the pair of second guide shaft fixtures (1160) is formed with an insertion groove through which a third distal end of the second guide shaft (1420, described later) is inserted. The remaining one of the pair of second guide shaft fixtures (1160) is formed with a through hole through which a fourth distal end facing the third distal end of the second guide shaft (1420, described later) passes.

In the present exemplary embodiment, the through hole for passing the fourth distal end of the second guide shaft (1420) may take the shape of an oblong or a slit.

A coupling hole is formed at a position facing each of third and fourth distal ends (1421, 1422) of the second guide shaft (1420) protruded outside of each of the second guide shaft fixtures (1160) on the upper plate (110), where each of the coupling holes is formed with a height adjustment screw (1149b). The height adjustment screw (1149b) adjusts a height between second guide shaft (1420) and the upper surface (1110).

Referring to FIGS. 7 and 8, a spindle motor body (1210) of the spindle motor (1200) is mounted at the upper plate (1110) of the base unit (1100) with a part of semi-circle opening.

The spindle motor (1200) is coupled to a mounting plate (1220), which is in turn coupled to the upper plate (1110) of the base unit (1100) via a plurality of coupling screw. In the second exemplary embodiment, the spindle motor may take various shapes, such that configuration of the spindle motor (1200) is not limited thereto. The stepping motor (1300) is coupled to the upper plate (1110) of the base unit (1100).

The stepping motor (1300) includes a stepping motor body (1310), a lead screw (1320), a pivot member (1325) and a cover case (1330).

The stepping motor body (1310) includes a stator (not shown), and the lead screw (1320) is rotated in association with the stator. In the present exemplary embodiment, the stepping motor body (1310) and the lead screw (1320) may include various configurations, such that the configuration of the stepping motor body (1310) is not limited thereto.

The lead screw (1320) is formed toward a radial direction of an optical disk secured at the disk fixture device (1220) of the spindle motor (1200). The lead screw (1320) is coupled at a distal end thereof with the cover case (1330), where the cover case (1330) is secured at the upper plate (1110) of the base unit (1100) via a coupling screw.

FIG. 10 is a perspective view illustrating first and second guide shafts mounted on the base unit of FIG. 8 for guiding an optical pickup module.

Referring to FIGS. 7 and 10, the optical pickup module (1400) reciprocates along a radial direction of the disk by the lead screw (1320) of the stepping motor (1300) secured to the upper plate (1110) of the base unit (1100) by a coupling screw, and first and second guide shafts (1410, 1420) arranged in parallel with the lead screw (1320).

The first guide shaft (1410) is slidably coupled to one side of the optical pickup module (1400). The first guide shaft (1410) is formed with a first distal end (1411) and a second distal end (1412) opposite to the first distal end (1411). The first and second distal ends (1411, 1412) of the first guide shaft (1410) are respectively coupled to the pair of first guide shaft fixtures (1150). The second guide shaft (1420) is slidably coupled to the other side of the optical pickup module (1400) facing the one side of the optical pickup module (1400).

The second guide shaft (1420) includes a third distal end (1421) and a fourth distal end (1422) opposite to the third distal end (1421). The third and fourth distal ends (1421, 1422) of the second guide shaft (1420) are respectively coupled to the pair of second guide shaft fixtures (1160).

Referring to FIG. 7 again, the first distal end (1411) of the first guide shaft (1410) is arranged with a first press member (1340) to inhibit the first and second distal ends (1411, 1412) of the first guide shaft (1410), and a second pressure member (1347) is arranged at the second distal end (1412).

The third distal end (1421) of the second guide shaft (1420) is arranged with a third pressure member (1348) to inhibit the third and fourth distal ends (1421, 1422) of the first guide shaft (1420), and a fourth pressure member (1349) is arranged at the fourth distal end (1422).

Each of the first to fourth pressure members (1340, 1347, 1348, 1349) takes the shape of a leaf spring, each distal end of one each side of the first to fourth pressure members (1340, 1347, 1348, 1349) is secured at the upper plate (1110), and each distal end facing the other each side of the first to fourth pressure members (1340, 1347, 1348, 1349) applies pressure to the first to fourth distal ends (1411, 1412, 1421, 1422).

The integrated disk driving module according to the second exemplary embodiment of the present disclosure has an advantageous effect in that a base unit is formed with a spindle motor fixture for mounting a lead screw of spindle motor, and the spindle motor fixture is mounted with the lead screw coupled to the spindle motor to reduce the number of parts of the integrated disk driving module, to reduce assembly time as a result of reduced number of parts, to improve product performance as a result of reduced assembly tolerances, to inhibit incomplete assembly and to reduce size and weight by arranging the spindle motor and the stepping motor at designated positions.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. An integrated disk driving module, the module comprising:
    a base unit including a spindle motor fixture including an opening-formed upper plate;
    a lateral surface plate bent from the upper plate to form an accommodation space;
    a spindle motor fixture concavely formed from the upper plate toward the accommodation space and integrally formed with the upper plate;
    a spindle motor fixed inside the spindle motor fixture to rotate a disk; and
    a circuit substrate interposed between the spindle motor and the floor unit to be electrically connected to the spindle motor,
    wherein the spindle motor fixture includes a lateral wall unit bent from the upper plate in a same direction as that of the lateral surface plate late, and a floor unit connected to the lateral wall unit, and
    wherein the floor unit is formed with at least one opening through which part of the circuit substrate passes.

2. The integrated disk driving module of claim 1, wherein the lateral wall unit is formed with at least one opening through which part of the circuit substrate passes.

3. The integrated disk driving module of claim 1, wherein the floor unit is formed with at least one floor unit-penetrating circuit substrate alignment hole for aligning the circuit substrate on a designated position on the floor unit.

4. The integrated disk driving module of claim 1, wherein a center of the floor unit of the upper plate is formed with a through hole, and a bearing housing of the spindle motor is coupled to the through hole of the floor unit by caulking.

5. The integrated disk driving module of claim 1, wherein an inner lateral surface of the floor unit formed by the through hole formed at the center of the floor unit is formed with an internal rotation prevention groove concavely formed from the inner lateral surface to prevent the bearing housing of the spindle motor from rotating relative to the floor unit.

6. The integrated disk driving module of claim 1, wherein the center of the floor unit is formed with a burring unit protruded from a bottom surface of the floor unit toward an upper surface facing the bottom surface, wherein the spindle motor includes a cup-shaped bearing housing coupled to the burring unit, a bearing coupled to an inner side of the bearing housing, a rotation shaft rotatably coupled to the bearing, a stator coupled to the bearing housing and a rotor coupled to the rotation shaft to interact with the stator.

7. The integrated disk driving module of claim 1, further comprising a lead screw fixed to the upper plate by a coupling screw.

8. The integrated disk driving module of claim 7, further comprising an optical pickup module that is fed by the stepping motor.

9. The integrated disk driving module of claim 7, further comprising first and second guide shafts coupled to the upper plate of the base unit to guide the optical pickup module.

10. The integrated disk driving module of claim 9, wherein the base unit includes a pair of first guide shaft fixtures bent from the upper plate to a direction of the accommodation space for respectively fixing a first distal end of the first guide shaft and a second distal end facing the first distal end, and a pair of second guide shaft fixtures bent from the upper plate to a direction of the accommodation space for respectively securing a third distal end of the second guide shaft and a fourth distal end facing the third distal end.

11. The integrated disk driving module of claim 10, wherein one of first guide shaft fixtures fixed to the first distal end is formed with a through hole through which the first distal end passes, and the remaining one first guide shaft fixture fixed to the second distal end is formed with an insert groove through which the second distal end is inserted.

12. The integrated disk driving module of claim 10, wherein one of second guide shaft fixtures fixed to the third distal end is formed with a through hole through which the third distal end passes, and the remaining one second guide shaft fixture fixed to the fourth distal end is formed with an insert groove through which the fourth distal end is inserted.

13. The integrated disk driving module of claim 10, wherein the integrated disk driving module further includes a first pressure member fixed at the upper plate for applying pressure to the first distal end, a second pressure member fixed at the upper plate for applying pressure to the second distal end, a third pressure member fixed at the upper plate for applying pressure to the third distal end, and a fourth pressure member fixed at the upper plate for applying pressure to the fourth distal end.

14. The integrated disk driving module of claim 13, wherein each of the first through fourth pressure members includes a leaf spring.

15. The integrated disk driving module of claim 10, further comprising a height adjustment screw coupled to the upper plate of the base unit to adjust heights of the first and second distal ends of the first guide shaft, and coupled to the upper plate of the base unit to adjust heights of the third and fourth distal ends of the second guide shaft.

16. An integrated disk driving module, the module comprising:
a base unit including a spindle motor fixture including an opening-formed upper plate;
a lateral surface plate bent from the upper plate to form an accommodation space;
a spindle motor fixture concavely formed from the upper plate toward the accommodation space and integrally formed with the upper plate;
a guide shaft fixture integrally formed with the upper plate;
a spindle motor fixed inside the spindle motor fixture to rotate a disk; and
a circuit substrate interposed between the spindle motor and the floor unit to be electrically connected to the spindle motor,
wherein the spindle motor fixture includes a lateral wall unit bent from the upper plate in a same direction as that of the lateral surface plate and a floor unit connected to the lateral wall unit, and
wherein the floor unit is formed with at least one opening through which part of the circuit substrate passes.

* * * * *